(12) United States Patent
Dawkins et al.

(10) Patent No.: US 8,420,732 B2
(45) Date of Patent: Apr. 16, 2013

(54) POLYBENZIMIDAZOLE SOLUTION IN AN IONIC LIQUID

(75) Inventors: Bobby G. Dawkins, Charlotte, NC (US); Barrie Davies, Waxhaw, NC (US); Gregory S. Copeland, Tega Cay, SC (US); William L. Lawson, III, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 0 days.

(21) Appl. No.: 12/974,089

(22) Filed: Dec. 21, 2010

(65) Prior Publication Data

US 2011/0152413 A1 Jun. 23, 2011

Related U.S. Application Data

(60) Provisional application No. 61/288,479, filed on Dec. 21, 2009.

(51) Int. Cl.
*C08L 77/00* (2006.01)
(52) U.S. Cl.
USPC .............. 524/606; 524/86; 524/115; 524/183
(58) Field of Classification Search .................. 524/612, 524/606, 86, 115, 183
See application file for complete search history.

(56) References Cited

U.S. PATENT DOCUMENTS

| | | | |
|---|---|---|---|
| 4,506,068 A | 3/1985 | Choe et al. | |
| 4,814,530 A | 3/1989 | Ward et al. | |
| 5,066,697 A | 11/1991 | Sandor et al. | |
| 7,619,037 B2 * | 11/2009 | Higuchi et al. | 525/88 |
| 2007/0151926 A1 | 7/2007 | Calundann et al. | |
| 2008/0044683 A1 | 2/2008 | Chan et al. | |
| 2008/0188636 A1 * | 8/2008 | Argyropoulos et al. | 527/300 |

FOREIGN PATENT DOCUMENTS

EP 2048183 A1 4/2009

OTHER PUBLICATIONS

Ye et al. (New membranes based on ionic liquids for PEM fuel cells at elevated temperatures, Journal of Power Sources 178 (2008) 651-660).*
Biao Wang et al., "Dissolution and regeneration of polybenzimidazoles using ionic liquids," European Polymer Journal, 45 ed., Elsevier Ltd. (Europe), (Issue. 45), (p. 2962-2965), (Jul. 7, 2009).
Wikipedia, "Ionic liquid," Website, Wikipedia, the free encyclopedia, Wikipedia.
RSC, "Salty solvents—ionic really," Website, Royal Society of Chemistry 2009.
Neil Winterton, "Solubilization of polymers by ionic liquids," Article—J. Mater. Chem., 16 ed., Royal Society of Chemistry 2006, (p. 4281-4293).
Jurgen Vitz et al., "Extended dissolution studies of cellulose in imidazolium based ionic liquids," Journal—The Royal Society of Chemistry 2009, Green Chemistry, (vol. 11), (p. 417-424).
Tim Liebert et al., "Interaction of Ionic Liquids With Polysaccharides 5. Solvents and Reaction Media for the Modification of Cellulose," Article—BioResources, 3(2) ed. (p. 576-601).
Vygodskii et al., "Synthesis of Polymers in Ionic Liquids as New Reaction Media," MAIK "Nauka/Interperiodica", 2001 ed., Doklady Chemistry, (vol. 381), (Issue. 4-6), (p. 353-355), (Aug. 31, 2001).
BASF, "Ionic Liquids: Frequently Asked Questions," Website, BASF, (p. 1-7).
He Rong-Huan et al., "Synthesis of Poly[2,2'-(m-phenyleen)-5,5'-bibenzimidazole] and Poly(2,5-benzimidazole) by Microwave Irradiation," Article, Chem. Res. Chinese Universities 2009, 25(4), 585-589.

* cited by examiner

*Primary Examiner* — Ling Choi
*Assistant Examiner* — Wenwen Cai
(74) *Attorney, Agent, or Firm* — Hammer & Associates, P.C.

(57) ABSTRACT

A polybenzimidazole solution comprises a polybenzimidazole dissolved in an ionic liquid excluding 1-butyl-3-methylimidazolium chloride, 1-butyl-3-methylimidazolium hydroxide, and 1-butyl-3-methylimidazolium tetrafluoroborate. The ionic liquid may be a salt having a melting point less than or equal to 100° C. The salt having a cation (+) and an anion (−). The cation may be selected from the group consisting of: choline, ammoniums, phosphoniums, pyridiniums, pyrrolidiniums, morpholimiums, pyrazoliums, sulfoniums, imidazoliums. The anion may be selected from the group consisting of: halides, bis(triflyl)amide, $CF_3SO_3^-$, hydroxides, nitrates, sulfates, acetates, cyanates, aluminates, borates, phosphates, phosphorates, alkylsulfates, tosylates.

16 Claims, No Drawings

POLYBENZIMIDAZOLE SOLUTION IN AN IONIC LIQUID

RELATED APPLICATIONS

The instant application claims the benefit of Provisional Application Ser. No. 61/288,479 filed Dec. 21, 2009.

FIELD OF THE INVENTION

The instant invention is directed to a solution where polybenzimidazole polymer is dissolved in an ionic liquid.

BACKGROUND OF THE INVENTION

Polybenzimidazoles (PBI), particularly aromatic PBIs, are characterized by a high degree of thermal stability and a great resistance to degradation by heat and hydrolytic and oxidizing media.

PBIs are not easy to make and once made, they are difficult to process. PBIs are made by a melt condensation reaction where monomers are polymerized, at high temperatures, to form a friable foam, the foam is crushed, and optionally the crushed PBI is further polymerized in a solid state. Since it is highly heat stable, the PBI resin must be dissolved, in the organic solvents mentioned below, for subsequent use, such as coatings and shaped articles (e.g., fibers, films, membranes, sheets, rods, billets, slabs).

PBIs are most commonly dissolved, by heating, in highly polar, aprotic organic solvents. Those solvents include: N,N-dimethylacetamide (DMAc); N,N-dimethylformamide (DMF), dimethylsulfoxide (DMSO), and N-methyl-2-pyrrolidone (NMP). While these solvents are effective, they are most often considered environmentaly unfriendly. See generally, Wang, B., et al., *Dissolution and regeneration of polybenzimidazoles using ionic liquids*, European Polymer Journal, EPJ 45 (2009) pages 2962-2965.

Recently, it has been reported that PBIs may be dissolved in certain ionic liquids. Wang, et al., Ibid. PBI is reported to have dissolved in 1-butyl-3-methylimidazolium chloride ([BMIM]Cl), 1-butyl-3-methylimidazolium hydroxide ([BMIM]OH), and 1-butyl-3-methylimidazolium tetrafluoroborate ([BMIM]BF$_4$).

Accordingly, there is a need for new solvents for PBI. Such solvents could replace the typically used organic solvents for the preparation of PBI solutions.

SUMMARY OF THE INVENTION

A polybenzimidazole solution comprises a polybenzimidazole dissolved in an ionic liquid excluding 1-butyl-3-methylimidazolium chloride, 1-butyl-3-methylimidazolium hydroxide, and 1-butyl-3-methylimidazolium tetrafluoroborate.

DESCRIPTION OF THE INVENTION

Polybenzimidazole (PBI) refers to, for example, the product of the melt polymerization of an tetraamine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details may be obtained from U.S. Pat. Nos. Re 26,065; 4,506,068; 4,814,530; and US Publication No. 2007/0151926, each of which is incorporated herein by reference. The PBI polymer may have an IV (inherent viscosity), discussed in detail in the experimental section below, in the range of 0.10-2.00 dL/g.

The aromatic and heteroaromatic tetra-amino compounds, used in accordance with the invention, are preferably 3,3',4,4'-tetra-aminobiphenyl, 2,3,5,6-tetra-aminopyridine, 1,2,4,5-tetra-aminobenzene, 3,3',4,4'-tetra-aminodiphenylsulfone, 3,3',4,4'-tetra-aminodiphenyl ether, 3,3',4,4'-tetra-aminobenzophenone, 3,3',4,4'-tetra-aminodiphenyl methane, and 3,3',4,4'-tetra-aminodiphenyldimethylmethane, and their salts, in particular, their mono-, di-, tri-, and tetrahydrochloride derivatives.

The aromatic carboxylic acids used, in accordance with the invention, are dicarboxylic acids or its esters, or its anhydrides or its acid chlorides. The term "aromatic carboxylic acids" equally comprises heteroaromatic carboxylic acids as well. Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-napthalenedicarboxylic acid, diphenic acid, 1,8-dihydroxynaphthalene-3,6-dicarboyxlic acid, diphenyl ether-4,4'-dicarboxylic acid, benzophenone-4,4'-dicarboxylic acid, diphenylsulfone-4,4'-dicarboyxlic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The heteroaromatic carboxylic acids used, in accordance with the invention, are heteroaromatic dicarboxylic acids or their esters or their anhydrides. The "heteroaromatic dicarboxylic acids" include aromatic systems that contain at least one nitrogen, oxygen, sulfur, or phosphorus atom in the ring. Preferably, it is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridine dicarboxylic acid, 3,5-pyrazole dicarboxylic acid, 2,6-pyrimidine dicarboxylic acid, 2,5-pyrazine dicarboxylic acid, 2,4,6-pyridine tricarboxylic acid, and benzimidazole-5,6-dicarboxylic acid, as well as their C1-C20-alkyl esters or C5-C12-aryl esters, or their acid anhydrides or their acid chlorides.

The aromatic and heteroaromatic diaminocarboxylic acid used in accordance with the invention is preferably diaminobenzoic acid and its mono- and dihydrochloride derivatives.

Preferably, mixtures of at least 2 different aromatic carboxylic acids are used. These mixtures are, in particular, mixtures of N-heteroaromatic dicarboxylic acids and aromatic dicarboxylic acids or their esters. Non-limiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynapthalene-3,6-dicarboxylic acid, diphenyl ether-4,4'-dicarboxylic acid, benzophenone-4,4'-dicarboxylic acid, diphenylsulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidine dicarboxylic acid, and 2,5-pyrazine dicarboxylic acid. Preferably, it is the diphenyl isophthalate (DPIP) and its ester.

Examples of polybenzimidazoles which may be prepared according to the process as described above include:
poly-2,2'-(m-phenylene)-5,5'-bibenzimidazole;
poly-2,2'-(biphenylene-2"2")-5,5'-bibenzimidazole;
poly-2,2'-(biphenylene-4"4")-5,5'-bibenzimidazole;
poly-2,2'-(1",1",3"trimethylindanylene)-3"5"-p-phenylene-5,5'-bibenzimidazole;
2,2'-(m-phenylene)-5,5'-bibenzimidazole/2,2-(1",1",3"-trimethylindanylene)-5",3"-(p-phenylene)-5,5'-bibenzimidazole copolymer;
2,2'-(m-phenylene)-5,5-bibenzimidazole-2,2'-biphenylene-2",2"-5,5'-bibenzimidazole copolymer;
poly-2,2'-(furylene-2",5")-5,5'-bibenzimidazole;
poly-2,2'-(naphthalene-1",6")-5,5'-bibenzimidazole;
poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2"-(m-phenylene)-5,5"-di(benzimidazole)propane-2,2; and poly-ethylene-1,2-2,2"-(m-phenylene)-5,5"-dibenzimidazole)ethylene-1,2 where the double bonds of the ethylene groups are intact in the final polymer. Poly-1,2'-(m-phenylene)-5,5'-bibenzimidazole, a preferred polymer, can be prepared by the reaction of 3,3',4,4'-tetraminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

Ionic liquids, which have previously been known as liquid electrolytes, ionic melts, ionic fluids, fused salts, liquid salts, and ionic glasses, refer to salts that form stable liquids. More specfically, ionic liquids refer to salts that have a melting temperature below 100° C., or, that are liquid at room temperature. Further information about ionic liquids may be obtained from: *Ionic Liquid*, Wikipedia (en.wikipedia.org/wiki/Ionic_liquid), 2009; and Abbott, A., & Davies, D., "*Salty Solvents—Ionic really*," Royal Society of Chemistry (www.rsc.org/Education/EiC/issues/2005_Jan/salty.asp), January, 2005; Winterton, N., *Solubilization of Polymers by ionic liquids*, J. Mater. Chem., 2006, 16, pages 4281-4293, each of which is incorporated herein by reference.

Generally, such ionic liquids consist of a cation (+) and an anion (−). The cations may include, but is not limited to, choline, ammoniums (e.g., quaternary ammoniums), phosphoniums, pyridiniums, pyrrolidiniums, morpholiniums, pyrazoliums, sulfoniums, and imidazoliums. The anions may include, but are not limited to, halides, bis(triflyl)amide [aka triflamide, bistriflimide, $(CF_3SO_2)_2N^-$], $CF_3SO_3^-$ [aka trifluoromethanesulfonate or triflate], nitrates, sulfates, acetates, cyanates, aluminates, borates boron fluorides (e.g., $BF_4^-$), phosphorus fluorides (e.g., $PF_6^-$), phosphorates (e.g., $PO_3^-$), hydroxides, alkylsulfates (e.g., methane sulfate, ethylene sulfate), tosylate.

Such ionic liquids may specifically include: choline chloride/urea mixtures, choline chloride/oxalic acid mixtures, 1-ethyl-3-methylimidazolium acetate, 1-ethyl-3-methylimidazolium chloride, 1-ethyl-3-methylimidazolium bis(triflyl)amide, 1-ethyl-3-methylimidazolium ethyl sulfate, 1-ethyl-3-methylimidazolium diethyl sulfate, 1-ethyl-3-methylimidazolium formate, 1-ethyl-3-methylimidazolium bis(trifluoromethane) sulfonamide, 1-ethyl-3-methylimidazolium phosphate, 1-methylimidazolium hydrogen sulfate, 1-butyl-1-methylpyrrolidinium trifluoromethylsulfate, 1-allyl-3-methylimidazolium acetate, 1-allyl-3-methylimidazolium chloride, 1-butyl-3-methylimidazolium acetate, 1-butyl-3-methylimidazolium bromide, 1-butyl-3-methylimidazolium dicyanoamide, 1-butyl-3-methylimidazolium formate, 1-butyl-3-methylimidazolium chloride, 1-butyl-3-methylimidazolium hydroxide, 1-butyl-3-methylimidazolium hydrogen sulfate, N-methyl morpholine N oxide (i.e., the solvent used for Tencel/Lyocel), 1-hexyl-3-methylimidazolium chloride, 1-butyl-2,3-dimethylimidazolium chloride, 1-allyl-2,3-diemthylimidazolium bromide, 1-butyl-3-methylpyridinium chloride, N-ethylpyridinium chloride, benzyldimethyl(tetradecyl)-ammonium chloride, 1,3-dibutylimidazolium bromide, 1,3-dibutylimidazolium tetrafluoroborate. Additional ionic liquids may be gleaned from: Wang, B, et al., *Dissolution and regeneration of polybenzimidazoles using ionic liquids*, European Polymer Journal 45 (2009) 2962-2965, *Ionic Liquid*, Wikipedia (en.wikipedia.org/wiki/Ionic_liquid), 2009; and Abbott, A., & Davies, D., "*Salty Solvents—Ionic really*," Royal Society of Chemistry (www.rsc.org/Education/EiC/issues/2005_Jan/salty.asp), January, 2005; Winterton, N., *Solubilization of Polymers by ionic liquids*, J. Mater. Chem., 2006, 16, pages 4281-4293, Vitz, J., et al., *Extended dissolution studies of cellulose in imidazolium based ionic liquids*, Green Chem., 2009, 11, 417-424; Liebert, T, et al., *Interaction of ionic liquids with polysaccharides*, Bioresources (2008) 3(2), 576-601; Vygodski, Y. S., *Synthesis of polymers in ionic liquids as new reaction media*, Doklady Chemistry (2001) vol. 381, nos 4-6, pp 353-355; www.basionics.com/en/ionic-liquids Frequently asked questions, each of which is incorporated herein by reference. In one embodiment, 1-ethyl-3-methylimidazolium acetate (EMIM acetate), 1-butyl-3-methylimidazolium acetate (BMIM acetate), and mixtures thereof are preferred.

PBI solutions in ionic liquids may be made by mixing the PBI polymer into the ionic liquid (or a mixture of ionic liquids). In one embodiment, this mixing is with agitation (e.g., stirring). In another embodiment, the mixing is with agitation and heat (heat including any external energy source, such as, for example, thermal and/or radiant (e.g., infrared (IR) and/or microwave)). In yet another embodiment, the mixing is with agitation, heat, and in an inert atmosphere (e.g., a nitrogen ($N_2$) purge or blanket). In one embodiment, when heat is used, the temperature should not exceed the temperature of decomposition of the ionic liquid. The time for dissolution may be any time. In one embodiment, the dissolution time may be less than 48 hours. In another embodiment, the dissolution time may be less than 24 hours. In yet another embodiment, the dissolution time may be less than 12 hours.

PBI solutions may have any % solid. In one embodiment, the % solids range from 0.1-99.0% solids. In another embodiment, the % solids may range from 0.1-90.0%. In another embodiment, the % solids may range from 20.0-70.0%. In yet another embodiment, the % solids may range from 30.0-60.0%. In other embodiments, the % solids are up to 35.0% (e.g., 0.1-35.0%) and most practically, based on experimental work disclosed herein in the range of 10.0-15.0%.

PBI polymer may be recovered (regenerated) from the PBI solutions by adding the PBI solution into a bath of material capable of precipitating or coaguluating the dissolved PBI polymer. Such materials include, but are not limited to, water, alcohols (e.g., methanol), and mixtures thereof. The PBI solution may be slowly added to the precipitating (coagulating) bath and the dissolved PBI polymer falls out of the solution. Thereafter, the precipitated polymer is harvested, and washed and dried, as necessary, for subsequent processing. Washing may be accomplished by the precipitating material. Drying is preferrably accomplished in an inert atmosphere.

PBI solutions in ionic liquids may be used to form dopes for coating or adhesive applications; or used in the wet spinning of PSI filaments; or wet forming of films, membranes (porous and non-porous), rod, billets, or slabs; or in mixing/ blending (fabrication) of PBIs with other polymers (e.g., PEEK, PEK, etc.) or materials or additives.

The foregoing is further illustrated with reference to the following non-limiting examples of the instant invention.

EXAMPLES

Dissolution of the polybenzimidazole in the ionic liquid was performed by adding a known quantity of PBI polymer to a 250 ml, three-neck, round bottom flask equipped with a water-cooled condenser, thermometer, and nitrogen purge; or a round bottom flask in a heating mantle/voltage regulator with a condenser and thermometer; or a beaker/Erlenmeyer flask on a hot plate with a magnetic stirrer. A weighed amount of ionic liquid was added to the flask. PBI polymer, prior to use, was dried in a vacuum oven at 150-180° C. with a nitrogen purge for at least one hour. A weighed amount of the dried PBI was added to the flask. The contents of the flask, weighed ionic liquid and PBI polymer, was stirred and purged with nitrogen, and the temperature was monitored. The contents of the flask were heated so as not to exceed the decomposition temperature of the ionic liquid, typically 150-200° C., with and without stirring. The weight of the PBI polymer was increased to determine the maximum solids level achievable under the conditions used. A collector flask was attached to the condensor in order to collect any condensates or by-products.

Regeneration of the PBI polymer from solution was performed by slowing adding the solution to stirred water. The PBI polymer was precipitated/coagulated from the solution. The recovered PBI polymer was washed with copius amounts of water, filtered, and then dried. The recovered PBI polymer was characterized for IV (inherent viscosity) and by molecular spectroscopy.

The results of the solutioning and regeneration of various PBI polymers in various ionic liquids are reported in Table 1 and discussed below.

Based upon the analysis of the regenerated PBI polymer and the collected condensates, only dissolution of the PBI polymer in the ionic liquid occurred. The regenerated PBI polymer closely resembled the starting PBI polymer with some residual ionic liquid, and the condensates showed mainly the ionic liquid decomposition products with some impurities.

The regenerated PBI polymer was found to have better dissolution characteristics compared to the starting materials. Presumably, this was due to the elimination of cross-linked high IV polymer and gels. IV's of the regenerated PBI polymers were found to decrease slightly upon dissolution and precipitation from the starting materials; presumably due to morphology changes and the elimination of high IV gel fractions.

TABLE 1

| Solvent | % Solids[1] | PBI polymer[2] | Temp.[3] (° C.) | Hold Time | IV[4] (dL/g) before/after | Stability[5] |
|---|---|---|---|---|---|---|
| Control[6] | 9.00 | 0.8 | — | — | 0.80/0.74 | — |
| EMIM[7] acetate | 9.08 | 0.8 | 185 | — | 0.89/0.70 | 4+ months |
| | 23.10 | 0.8 | 187 | — | 0.89/0.64 | 4+ months |
| | 34.80 | 0.8 | 180 | — | — | 3+ months |
| | 13.90 | 0.5 | 185 | — | 0.41/0.66 | 4+ months |
| | 5.02 | 0.2 | 155-171 | 1 hr | 0.20/0.13 | — |
| | 8.58 | 0.2 | 390 | — | 0.20/0.21 | — |
| | 9.39 | 0.2 | 392 | — | 0.25/0.26 | — |
| | 10.20 | 0.2 | 360 | — | 0.22/0.24 | — |
| BMIM[8] acetate | 8.65 | 0.8 | 190 | — | 0.89/0.83 | 4+ months |
| | 17.00 | 0.8 | 180 | — | 0.89/0.80 | 4+ months |
| | 8.87 | 0.2 | 200 | 33 min | — | — |
| | 9.34 | 0.2 | 300-325 | 2 hr 20 min | 0.20/0.20 | — |
| | 19.50 | 0.2 | 192 | 42 min | — | — |
| Choline chloride + urea | 15.00 | 0.2 | 200-246 | 40 min | — | — |
| Choline chloride + oxalic acid | 4.99 | 0.2 | 140-149 | 1.25 hr | 0.20/0.17 | — |
| | 9.19 | 0.2 | 147-169 | 3.5 hr | 0.20/0.17 | — |

TABLE 1-continued

| Solvent | % Solids[1] | PBI polymer[2] | Temp.[3] (° C.) | Hold Time | IV[4] (dL/g) before/after | Stability[5] |
|---|---|---|---|---|---|---|
| EMIM diethyl phosphate | 15.02 | 0.2 | 123 | 2 hr | — | ND[9] |
|  | 15.02 | 0.2 | 150 | 1 hr | — | ND |
|  | 15.02 | 0.2 | 192 | 45 min | — | ND |

[1] % solids = {solute (g)/[solute (g) + solvent (g)]} × 100
[2] PBI polymer is identified by IV, inherent viscosity (dL/g), discussed in detail below.
[3] Temp. is the maximum temperature during dissolution of the polymer
[4] IV (inherent visosity), as used herein, is the ratio of the specific viscosity of a solution of known concentration to the concentration of the solute extrapolated to zero concentration, measured in units of dL/g (deciliters/gram). It is directly proportional to the polymer-average molecular weight, and is based on the concentration of the polymer sample tested, g/100 ml or g/deciliter. The polymer is dissolved at the 0.4% (w/v) level in 100 ml of 96.5% (+/− 0.5%) sulfuric acid at 80 C. After filtering, an aliquot is measured for IV using a calibrated Cannon-Fenske capillary viscometer in a 25 C. (+/− 0.1° C.) water bath, the flow time (sec.) of the PBI polymer solution measured vs. the dissolving solvent: IV = ln $(t_1/t_2)/c$, where the natural log of the flow time of the PBI solution $(t_1)$ over the flow time of the solvent $(t_2)$ is divided by the PBI solution concentration (c).
[5] Stability repesents the time observed and not necessarily the maximum time of stability.
[6] PBI in DMAc
[7] EMIM = 1-ethyl-3-methylimidazolium
[8] BMIM = 1-butyl-3-methylimidazolium
[9] ND indicates that the polymer did not dissolve.

The present invention may be embodied in other forms without departing from the spirit and the essential attributes thereof, and, accordingly, reference should be made to the appended claims, rather than to the foregoing specification, as indicated the scope of the invention.

We claim:

1. A polybenzimidazole solution consisting of:
a polybenzimidazole dissolved in an ionic liquid, said ionic liquid being selected from the group consisting of: choline chloride/urea mixtures, choline chloride/oxalic acid mixtures, 1-ethyl-3-methylimidazolium acetate, 1-ethyl-3-methylimidazolium chloride, 1-ethyl-3-methylimidazolium bis(triflyl)amide, 1-ethyl-3-methylimidazolium ethyl sulfate, 1-ethyl-3-methylimidazolium diethyl sulfate, 1-ethyl-3-methylimidazolium formate, 1-ethyl-3-methylimidazolium bis(trifluoromethane)sulfonamide, 1-ethyl-3-methylimidazolium phosphate, 1-methylimidazolium hydrogen sulfate, 1-butyl-1-methylpyrrolidinium trifluoromethylsulfate, 1-allyl-3-methylimidazolium acetate, 1-allyl-3-methylimidazolium chloride, 1-butyl-3-methylimidazolium acetate, 1-butyl-3-methylimidazolium bromide, 1-butyl-3-methylimidazolium dicyanoamide, 1-butyl-3-methylimidazolium formate, 1-butyl-3-methylimidazolium chloride, 1-butyl-3-methylimidazolium hydroxide, 1-butyl-3-methylimidazolium hydrogen sulfate, N-methyl morpholine N oxide, 1-hexyl-3-methylimidazolium chloride, 1-butyl-2,3-dimethylimidazolium chloride, 1-allyl-2,3-diemthylimidazolium bromide, 1-butyl-3-methylpyridinium chloride, N-ethylpyridinium chloride, benzyldimethyl(tetradecyl)-ammonium chloride, 1,3-dibutylimidazolium bromide, 1,3-dibutylimidazolium tetrafluoroborate, and mixtures thereof, and excluding 1-butyl-3-methylimidazolium chloride, 1-butyl-3-methylimidazolium hydroxide, and 1-butyl-3-methylimidazolium tetrafluoroborate.

2. The polybenzimidazole solution according to claim 1 wherein said ionic liquid being a salt having a melting point less than or equal to 100° C.

3. The polybenzimidazole solution according to claim 1 wherein said ionic liquid being selected from the group consisting of: 1-ethyl-3-methylimidazolium acetate, 1-butyl-3-methylimidazolium acetate, and mixtures thereof.

4. The polybenzimidazole solution according to claim 1 having a percent solids up to 35.0 wt %.

5. The polybenzimidazole solution according to claim 1 wherein said ionic liquid excludes 1-ethyl-3-methylimidazolium diethyl phosphate.

6. A polybenzimidazole solution consisting of:
a polybenzimidazole dissolved in an ionic liquid, said ionic liquid being a salt having a melting point less than or equal to 100° C., said salt having a cation (+) and an anion (−), said cation being selected from the group consisting of choline, quaternary ammoniums, phosphoniums, pyridiniums, pyrrolidiniums, morpholimiums, pyrazoliums, sulfoniums, imidazoliums, said anion being selected from the group consisting of bis(triflyl)amide, $CF_3SO_3^-$, hydroxides, aluminates, boron fluorides, alkylsulfates, tosylates; and said ionic liquid excluding 1-butyl-3-methylimidazolium chloride, 1-butyl-3-methylimidazolium hydroxide, and 1-butyl-3-methylimidazolium tetrafluoroborate.

7. The polybenzimidazole solution according to claim 6 having a percent solids up to 35.0 wt %.

8. The polybenzimidazole solution according to claim 6 wherein said ionic liquid excludes 1-ethyl-3-methylimidazolium diethyl phosphate.

9. A polybenzimidazole solution consisting of:
a polybenzimidazole dissolved in an ionic liquid, said ionic liquid being a salt having a melting point less than or equal to 100° C., said salt having a cation (+) and an anion (−), said cation being selected from the group consisting of quaternary ammoniums, phosphoniums, pyrrolidiniums, sulfoniums, and said anion being selected from the group consisting of halides, bis(triflyl)amide, $CF_3SO_3^-$, hydroxides, nitrates, sulfates, acetates, cyanates, aluminates, boron fluorides, bromides, phosphates, phosphorates, alkylsulfates, tosylates, and said ionic liquid excluding 1-butyl-3-methylimidazolium chloride, 1-butyl-3-methylimidazolium hydroxide, and 1-butyl-3-methylimidazolium tetrafluoroborate.

10. The polybenzimidazole solution according to claim 9 having a percent solids up to 35.0 wt %.

11. The polybenzimidazole solution according to claim 9 wherein said ionic liquid excludes 1-ethyl-3-methylimidazolium diethyl phosphate.

12. A polybenzimidazole solution consisting of:
up to 35 wt % solids of a polybenzimidazole dissolved in an ionic liquid, said ionic liquid being selected from the group consisting of: choline chloride/urea mixtures, choline chloride/oxalic acid mixtures, 1-ethyl-3-methylimidazolium acetate, 1-ethyl-3-methylimidazolium chloride, 1-ethyl-3-methylimidazolium bis(triflyl)amide, 1-ethyl-3-methylimidazolium ethyl sulfate, 1-ethyl-3-methylimidazolium diethyl sulfate, 1-ethyl-3-methylimidazolium formate, 1-ethyl-3-methylimidazolium bis(trifluoromethane) sulfonamide, 1-ethyl-3-methylimidazolium phosphate, 1-methylimidazolium hydrogen sulfate, 1-butyl-1-methylpyrrolidinium trifluoromethylsulfate, 1-allyl-3-methylimidazolium acetate, 1-allyl-3-methylimidazolium chloride, 1-butyl-3-methylimidazolium acetate, 1-butyl-3-methylimidazolium bromide, 1-butyl-3-methylimidazolium dicyanoamide, 1-butyl-3-methylimidazolium formate, 1-butyl-3-methylimidazolium chloride, 1-butyl-3-methylimidazolium hydroxide, 1-butyl-3-methylimidazolium hydrogen sulfate, N-methyl morpholine N oxide, 1-hexyl-3-methylimidazolium chloride, 1-butyl-2,3-dimethylimidazolium chloride, 1-allyl-2,3-diemthylimidazolium bromide, 1-butyl-3-methylpyridinium chloride, N-ethylpyridinium chloride, benzyldimethyl (tetradecyl)-ammonium chloride, 1,3-dibutylimidazolium bromide, 1,3-dibutylimidazolium tetrafluoroborate, and mixtures thereof, and excluding 1-butyl-3-methylimidazolium chloride, 1-butyl-3-methylimidazolium hydroxide, and 1-butyl-3-methylimidazolium tetrafluoroborate.

13. The polybenzimidazole solution according to claim 12 wherein said ionic liquid being a salt having a melting point less than or equal to 100° C.

14. The polybenzimidazole solution according to claim 13 where said salt having a cation (+) and an anion (−),
   said cation being selected from the group consisting of: choline, ammoniums, phosphoniums, pyridiniums, pyrrolidiniums, morpholimiums, pyrazoliums, sulfoniums, imidazoliums, and
   said anion being selected from the group consisting of: halides, bis(triflyl)amide, $CF_3SO_3^-$, hydroxides, nitrates, sulfates, acetates, cyanates, aluminates, boron fluorides, phosphates, phosphorates, alkylsulfates, tosylates.

15. The polybenzimidazole solution according to claim 12 wherein said ionic liquid being selected from the group consisting of: 1-ethyl-3-methylimidazolium acetate, 1-butyl-3-methylimidazolium acetate, and mixtures thereof.

16. The polybenzimidazole solution according to claim 12 wherein said ionic liquid excludes 1-ethyl-3-methylimidazolium diethyl phosphate.

\* \* \* \* \*